(12) United States Patent
Kim (10) Patent No.: US 8,736,801 B2
(45) Date of Patent: May 27, 2014

(54) DISPLAY PANEL AND DISPLAY DEVICE COMPRISING THE SAME

(75) Inventor: Young Joe Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 329 days.

(21) Appl. No.: 13/164,338

(22) Filed: Jun. 20, 2011

(65) Prior Publication Data

US 2011/0310543 A1    Dec. 22, 2011

(30) Foreign Application Priority Data

Jun. 22, 2010   (KR) ......................... 10-2010-0058960

(51) Int. Cl.
*G02F 1/1345* (2006.01)
(52) U.S. Cl.
USPC .......................................... 349/152; 349/151
(58) Field of Classification Search
None
See application file for complete search history.

(56) References Cited

U.S. PATENT DOCUMENTS

| 7,349,055 B2 * | 3/2008 | Lee et al. ................... 349/152 |
| 2006/0232915 A1 * | 10/2006 | Chou et al. .................. 361/681 |
| 2011/0254757 A1 * | 10/2011 | Kim .............................. 345/76 |

* cited by examiner

*Primary Examiner* — Lucy Chien
(74) *Attorney, Agent, or Firm* — Birch, Stewart, Kolasch & Birch, LLP (57) ABSTRACT

A display panel and a display device having the display panel are discussed. According to an embodiment, the display panel includes a lower substrate provided with a display area and a non-display area; a plurality of data pad portions formed at a side region of the non-display area; an upper substrate bonded to the lower substrate, except for the side region of the non-display area; and at least one ground line supplied with ground power, and formed on the lower substrate of the non-display area to surround in part an outline portion of the display area.

15 Claims, 4 Drawing Sheets

DISPLAY PANEL AND DISPLAY DEVICE COMPRISING THE SAME

CROSS REFERENCE TO RELATED APPLICATIONS

This application claims the priority benefit of the Korean Patent Application No. 10-2010-0058960 filed on Jun. 22, 2010, which is hereby incorporated by reference for all purposes as if fully set forth herein.

BACKGROUND OF THE INVENTION

1. Field of the Invention

The present invention relates to a display device, and more particularly, to a display panel and a display device comprising the same, in which a thickness of the display device can be minimized and an electrostatic defect can be prevented from occurring by removing some of a case and/or set cover parts regarded as necessities of a display product and thereby improving tolerance against static electricity.

2. Discussion of the Related Art

Recently, various flat panel display devices, which can reduce weight and volume acting as disadvantages of a cathode ray tube, have been developed. Although flat panel display devices such as a liquid crystal display device, a plasma display panel, a field emission display device, and a light emitting display device have been actively studied, the liquid crystal display device has received much attention owing to its advantages of mass production technology, facilitation of a driving means, and high picture quality.

Recently, with the research and development in technical aspects of the flat panel display devices, there is a need for the research and development in design aspects of products that can appeal to consumers. In this respect, efforts to minimize or reduce the thickness of a display device have been made, and the need for a display design having an increased aesthetic sense has increased gradually to appeal to the aesthetic sense of the consumers and buyers.

Although some designs for the slimness of the display device or more aesthetically pleasing display devices have been developed, such designs have maintained the existing elements of the display device with their structures being modified. In those cases, however, there are limitations in reducing the thickness of the display device and developing a new and innovative design for the display device.

For example, according to the related art, a liquid crystal display device requires a lower case and an upper case to receive a display panel and a back light unit. Also, in order to make the liquid crystal display device products such as notebook computers, monitors, mobile devices and televisions to be sufficiently rigid, separate front and rear set covers have been used additionally. As a result, in addition to the lower case and the upper case, the front and rear set covers were required for the related art display devices/products, which in turn limits reducing the thickness of the liquid crystal display device or modifying the design of the liquid crystal display device.

SUMMARY OF THE INVENTION

Accordingly, the present invention is directed to a display panel and a display device comprising the same, which substantially obviate one or more problems due to limitations and disadvantages of the related art.

An advantage of the present invention is to provide a display panel and a display device comprising the same, in which a thickness of the display device can be minimized and an electrostatic defect can be prevented from occurring by removing some of a case and/or set cover parts previously regarded as required in related art display products and thereby improving the tolerance against static electricity.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display panel according to an embodiment of the present invention comprises a lower substrate provided with a display area and a non-display area; a plurality of data pad portions formed at one side region of the non-display area; an upper substrate bonded to the lower substrate except the side region of the non-display area; and a ground line supplied with a ground power, and formed on the lower substrate of the non-display area to surround the outline portion of the display area except the data pad portions.

In another aspect of the present invention, a display device comprises a display unit including a display panel; a guide frame supporting the display unit; and a rear set cover supporting the guide frame, wherein the display panel comprises: a lower substrate provided with a display area and a non-display area, the display area having a plurality of pixels formed per pixel area defined by crossing between a plurality of gate lines and a plurality of data lines, and the non-display area being provided at an outline portion of the display area; a plurality of data pad portions formed at one side region of the non-display area, the plurality data pad portions having a plurality of data pads connected to the plurality of data lines; an upper substrate bonded to the lower substrate except the side region of the non-display area; and a ground line supplied with a ground power, and formed on the lower substrate of the non-display area to surround the outline portion of the display area except the data pad portions.

According to an embodiment of the invention, a display panel includes a lower substrate provided with a display area and a non-display area; a plurality of data pad portions formed at a side region of the non-display area; an upper substrate bonded to the lower substrate, except for the side region of the non-display area; and at least one ground line supplied with ground power, and formed on the lower substrate of the non-display area to surround in part an outline portion of the display area.

According to an embodiment of the invention, a display device includes a display unit including a display panel; a guide frame for supporting the display unit; and a rear set cover for supporting the guide frame, wherein the display panel includes: a lower substrate provided with a display area and a non-display area; a plurality of data pad portions formed at one side region of the non-display area; an upper substrate bonded to the lower substrate, except for the side region of the non-display area; and at least one ground line supplied with a ground power, and formed on the lower substrate of the non-display area to surround in part the an outline portion of the display area.

According to an embodiment of the invention, a display device includes a display unit including a display panel and a backlight unit; a guide frame disposed in part between the display panel and the backlight unit and including a panel supporter for supporting the display panel thereon; and a rear set cover including an area for receiving the backlight unit therein, wherein either a portion of the guide frame or a portion of the rear set cover extends forwardly so as to form a front face of the display device along with the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Figure 1:
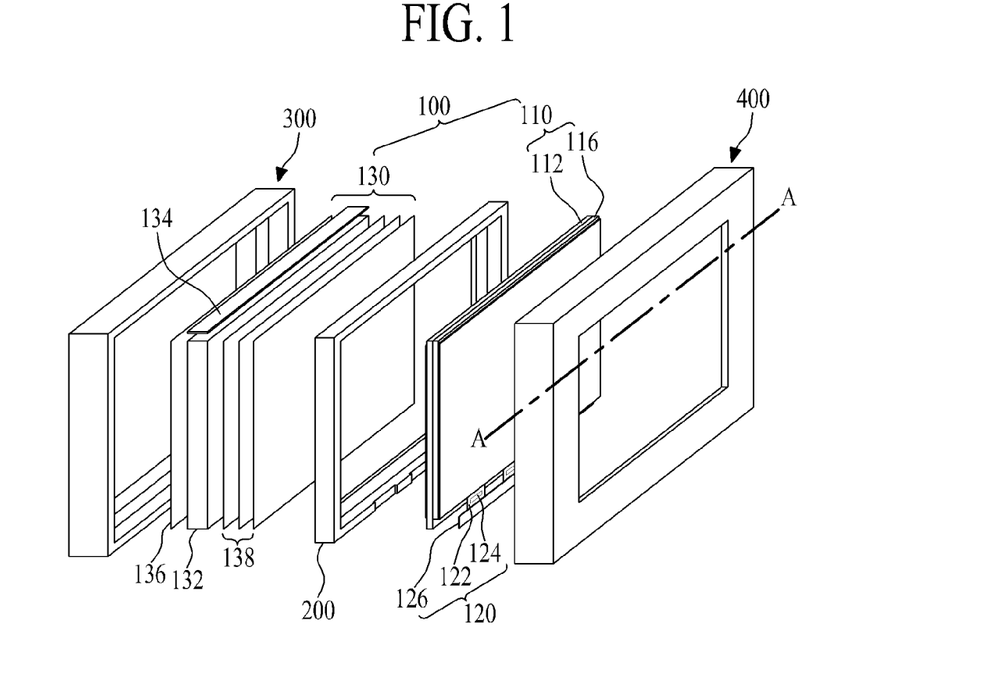
FIG. 1 is an exploded perspective view illustrating a display device according to a first embodiment of the present invention.
Figure 2:
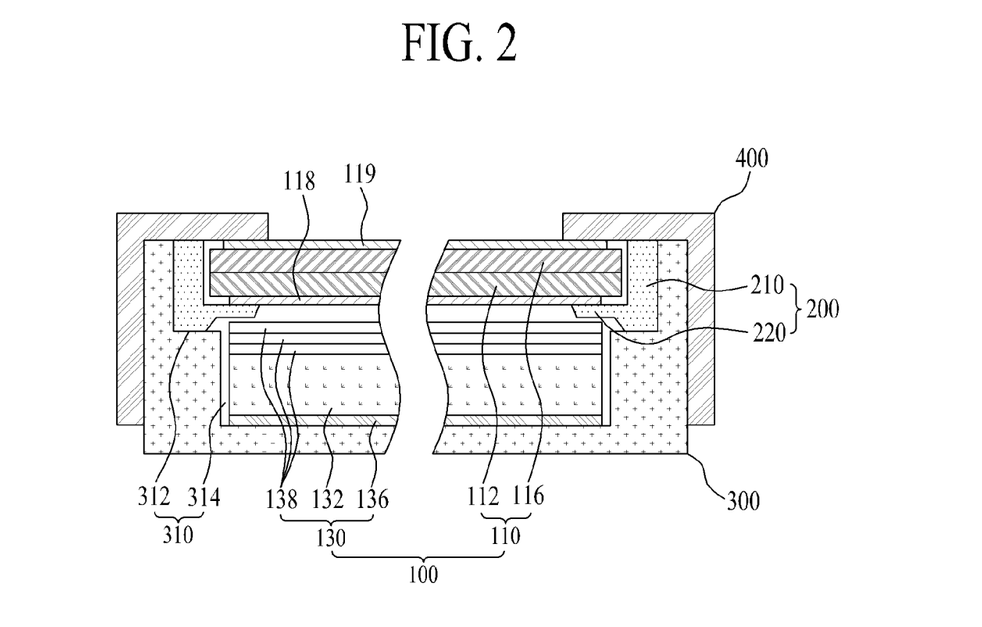
FIG. 2 is a sectional view illustrating a section taken along line A-A of FIG. 1.

FIG. 1 is an exploded perspective view illustrating a display device according to the first embodiment of the present invention, and FIG. 2 is a sectional view illustrating a section taken along line A-A of FIG. 1.

Referring to FIGS. 1 and 2, the display device according to the first embodiment of the present invention includes a display unit 100, a guide frame 200, a rear set cover 300, and a front set cover 400. The display unit 100 includes a display panel 110, a panel driver 120, and a back light unit 130. All the components of the display device are operatively coupled and configured.

Figure 3:
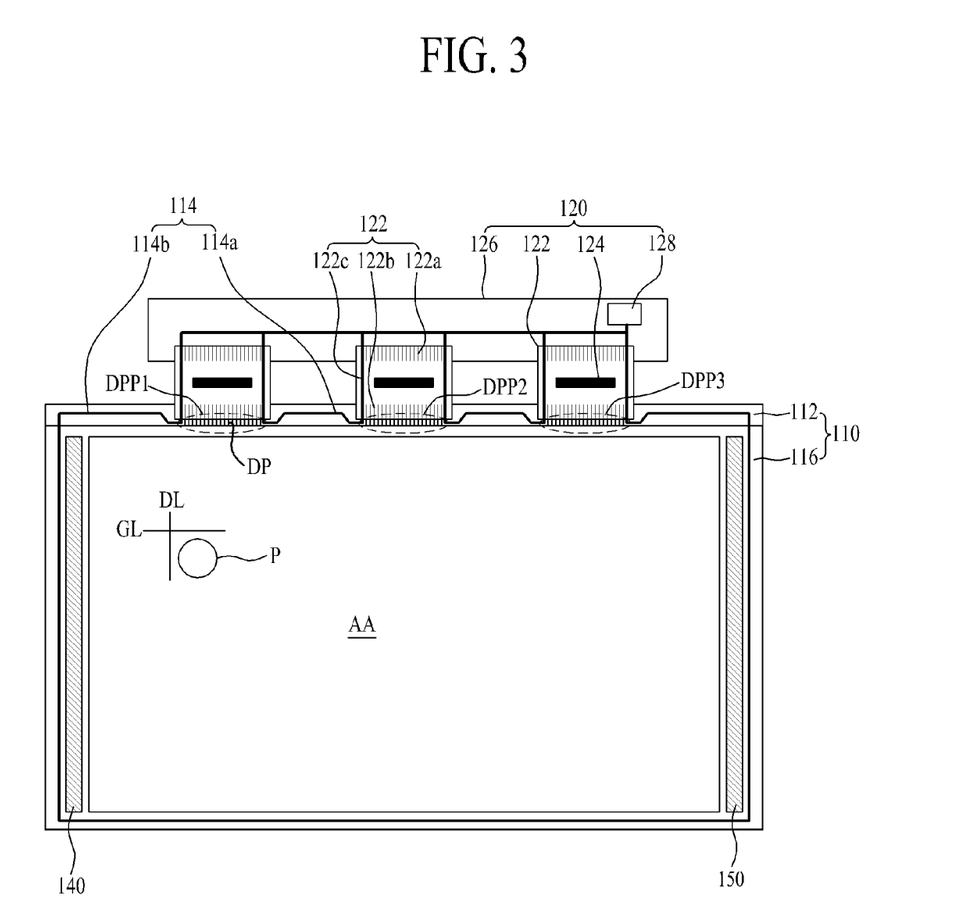
FIG. 3 is a plane view illustrating a display panel and a panel driver illustrated in FIG. 1 according to an embodiment of the present invention.

As shown in FIG. 3, the display panel 110 includes a lower substrate 112, a plurality of data pad portions DPP1, DPP2 and DPP3, a ground line 114, and an upper substrate 116. The lower substrate 112 includes a display area AA (or called as an active area) and a non-display area provided at an outline portion of the display area AA. The non-display area may surround the display area AA.

Preferably the display area AA is defined by all outer portions except for the edge portions of the lower substrate 112 to display a predetermined image. For this, the display area AA includes a plurality of pixels P formed per pixel area defined by crossing between a plurality of gate lines GL and a plurality of data lines DL.

Each of the pixels P includes a thin film transistor connected to the corresponding gate line GL and the corresponding data line DL, a pixel electrode connected to the thin film transistor, and a common electrode formed to adjoin the pixel electrode, wherein a common voltage is applied to the common electrode. At this time, the common electrode may be formed in the upper substrate 116 depending on a driving mode of a liquid crystal layer. The lower substrate 112 controls the light transmittance of the liquid crystal layer by forming an electric field corresponding to a secondary voltage of the common voltage and a data signal applied to each pixel P.

The non-display area is generally defined by edge portions of the lower substrate 112 to correspond to the outline portion of the display area AA.

The plurality of data pad portions DPP1, DPP2 and DPP3 are respectively formed above the non-display area at predetermined intervals, and each of the data pad portions includes a plurality of data pads DP electrically connected to the plurality of data lines DL. In this case, each of the plurality of data pad portions DPP1, DPP2 and DPP3 has N data pads DP connected to N data lines DL.

Each of the plurality of data pads DP is electrically connected to the panel driver 120 and supplies a data signal, which is supplied from the panel driver 120, to the corresponding data line DL.

The ground line 114 is formed in the non-display area to surround the outline portion of the lower substrate 112 other than a part above the non-display area where the plurality of data pad portions DPP1, DPP2 and DPP3 are formed, thereby improving the tolerance characteristics against the static electricity externally generated and thereby preventing an electrostatic defect from occurring. For this, the ground line 114 includes a plurality of first ground lines 114a and a second ground line 114b.

Each of the plurality of first ground lines 114a is formed above the non-display area, and is formed between the respective data pad portions DPP1, DPP2 and DPP3. A ground power is supplied from the panel driver 120 to each of the plurality of first ground lines 114a through each of the plurality of data pad portions DPP1, DPP2 and DPP3. For this, each of the first data pad portion DPP1 and the last data pad portion DPP3 further includes a first ground pad connected to the first ground lines 114a adjacent to its one side, and a second ground pad connected to the second ground line. The other data pad portion DPP2 except the first data pad portion DPP1 and the last data pad portion DPP3 further includes third and fourth ground pads connected to the first ground lines 114a adjacent to its both sides. Although in FIG. 3, three data pad portions DPP1-DPP3 are shown, any number of data pad portions can be present.

The second ground line 114b is continuously formed in the non-display area to surround the outline portion of the lower substrate, except for the part above the non-display area where the plurality of first ground lines 114a and the plurality of data pad portions DPP1, DPP2 and DPP3 are formed. For instance, the second ground line 114b is continuously formed with seamlessness to be connected to the non-display area at the left upper side, the left side, the lower side, the right side, and the right upper side of the lower substrate 112. At this time, one end of the second ground line 114b is connected to the second ground pad of the first data pad portion DPP1, and its other end is connected to the second ground pad of the last data pad portion DPP3.

The aforementioned first ground lines 114a and the second ground line 114b may be formed together with the gate lines GL or the data lines DL. For instance, when the gate lines and data lines are formed, the first and second ground lines 114a and 114b may be formed at the same or similar time.

Meanwhile, the lower substrate 112 further includes first and second gate driving circuits 140 and 150. The first gate driving circuit 140 is formed in the non-display area adjacent the left side of the display area AA when the pixels P are formed, thereby driving the gate lines GL. For this, the first gate driving circuit 140 includes gate control signal lines to which a plurality of gate control signals from the panel driver 120 are supplied, and a plurality of stages generating gate signals in accordance with the plurality of gate control signals to sequentially supply the generated gate signals to the gate lines GL. In this case, the plurality of gate control signals may be gate start pulses or a plurality of gate clock signals. The first gate driving circuit 140 generates the gate signals in accordance with sequential driving of the plurality of stages to sequentially supply the generated gate signals to the odd numbered gate lines of the plurality of gate lines GL.

The second gate driving circuit 150 is formed in the non-display area adjacent the right side of the display area AA when the pixels P are formed, thereby driving the gate lines GL. For this, the second gate driving circuit 150 includes gate control signal lines and a plurality of stages in the same manner as the first gate driving circuit 140. The second gate driving circuit 150 generates gate signals in accordance with sequential driving of the plurality of stages to sequentially supply the generated gate signals to the even numbered gate lines of the plurality of gate lines GL.

Meanwhile, although it has been described that the first and second gate driving circuits 140 and 150 supply the gate signals to their respective gate lines, the first and second gate driving circuits 140 and 150 may supply the gate signals to the same gate lines if the display panel 110 has a large size. Further, as a variation, the first and second gate driving circuits 140 and 150 may supply the gate signals to even numbered gate lines and odd numbered gate lines, respectively.

Also, although it has been described in the first embodiment that the first and second gate driving circuits 140 and 150 are formed in the lower substrate 112, the invention is not limited to the embodiment. For instance, any one of the first and second gate driving circuits 140 and 150 may alone be formed to sequentially supply the gate signals to all of the plurality of gate lines.

Moreover, although it has been described in the first embodiment that the first and second gate driving circuits 140 and 150 are directly formed in the non-display area of the lower substrate 112, the invention is not limited to this example. For instance, the first and second gate driving circuits 140 and 150 may be manufactured as separate driving chip(s) so that they may be packaged in the aforementioned non-display area, or may be packaged in separate circuit film(s) and then attached to the aforementioned non-display area.

The upper substrate 116 preferably includes a color filter corresponding to each of the pixels formed in the lower substrate 112. Also, a common electrode to which a common voltage is supplied in accordance with a driving mode of the display panel 110 may be formed in the upper substrate 116. As a variation, the common electrode may be formed in the lower substrate 112. The upper substrate 116 is bonded to the lower substrate 112 except for the areas where the plurality of data pad portions DPP1, DPP2 and DPP3 are provided. The liquid crystal layer is formed between the lower substrate 112 and the upper substrate 116.

The aforementioned upper substrate 116 filters light incident through the liquid crystal layer to emit predetermined color light to the outside, whereby a predetermined color image is displayed on the display panel 110.

Meanwhile, a detailed structure of the lower and upper substrates 112 and 116 may vary according to the driving mode of the display panel 110, for example, Twisted Nematic (TN) mode, Vertical Alignment (VA) mode, In-Plane Switching (IPS) mode, Fringe Field Switching (FFS) mode, and etc., which are generally known to those skilled in the art.

Meanwhile, the display panel 110, as shown in FIG. 2, further includes a lower polarizer 118 and an upper polarizer 119. The lower polarizer 118 is formed on a rear surface of the lower substrate 112 and polarizes incident light from the back light unit 130 and then irradiates the polarized light to the lower substrate 112.

The upper polarizer 119 is formed on a top surface of the upper substrate 116 and polarizes the incident light through the upper substrate 116 and then emits the polarized light to the outside.

In FIG. 1, the panel driver 120, as shown in FIG. 3 includes a plurality of circuit films 122, a plurality of data driving chips 124, and a printed circuit board 126.

Each of the plurality of circuit films 122 is connected to each of the plurality of data pad portions DPP1, DPP2 and DPP3 provided in the non-display area above the lower substrate, thereby being connected to the corresponding data line DL. At this time, each of the plurality of circuit films 122 is attached to each of the plurality of data pad portions DPP1, DPP2 and DPP3 by a TAB (tape automated bonding) process. Each of the plurality of circuit films 122 can be made of a TCP (tape carrier package) or COF (chip on flexible board or chip on film), which has a plurality of input and output pads 122a and 122b.

Meanwhile, each of the plurality of circuit films 122 further includes one or more ground power pads 122c connected to the printed circuit board 126 and the ground pad of each of the plurality of data pad portions, for supplying a ground power to the ground pad, wherein the ground power from the printed circuit board 126 is supplied to the ground power pads 122c and to the ground lines 114a and 114b. In this case, the ground line 114 is formed in the non-display area of the other lower substrate 112, except for a part above the non-display area where the plurality of data pad portions DPP1, DPP2 and DPP3 are formed, and at the same time the ground line 114 is connected to the printed circuit board 126. As a result, a closed loop is formed, whereby tolerance of the display panel 110 is improved.

The plurality of data driving chips 124 are packaged in each of the plurality of circuit films 122. The plurality of data driving chips 124 convert image data supplied from the input pads 122a of the circuit film 122 to a data signal of an analog type, and supply the converted data signal to the corresponding data line through the output pads 122b of the circuit film 122.

The printed circuit board 126 is attached to the input pads 122a of each of the plurality circuit films 122 through the TAB process. The printed circuit board 126 supplies image data to the plurality of data driving chips 124 and at the same time supplies a control signal for displaying an image in the display panel 110 and a driving power (for example, driving voltage, gamma voltage, ground power, etc.) to the display panel. For this, a timing controller for generating image data and control signal(s) and a driving power generator 128 for generating a driving power are preferably packaged in the printed circuit board 126.

In FIGS. 1 and 2, the back light unit 130 irradiates light to the rear surface of the display panel 110. For this, the back light unit 130 includes a light-guide plate 132, a light source 134, a reflecting sheet 136, and an optical member 138.

The light-guide plate 132 is formed to have an incident light surface, and guides the light incident upon the incident light surface to the display panel 110. The light source 134 is arranged to face the incident light surface of the light-guide plate 132 and irradiates the light to the incident light surface of the light-guide plate 132. For this, the light source 134 may include one or more fluorescent lamps or one or more light-emitting diodes. The light source 134 may be disposed at one or more sides of the light-guide plate 132 or as a variation, may be disposed at a rear side of the light-guide plate 132, The reflecting sheet 136 is arranged on the rear surface of the light-guide plate 132 to reflect the incident light from the light-guide plate 132 towards the light-guide plate 132.

The optical member 138 is arranged on the light-guide plate 132 and improves luminance characteristics of the light ongoing from the light-guide plate 132 to the display panel 110. For this, the optical member 138 may include one or more of a lower diffusion sheet, a lower prism sheet, an upper prism sheet, and an upper diffusion sheet.

The lower diffusion sheet is arranged on the light-guide plate 132 to diffuse the light from the light-guide plate 132 and irradiates the light to the lower prism sheet. The lower prism sheet is arranged on the lower diffusion sheet and condenses the incident light from the lower diffusion sheet in a first direction to irradiate the condensed light to the upper prism sheet. In this case, the first direction may correspond to a longitudinal or short direction of the light-guide plate 132.

The upper prism is arranged on the lower prism sheet and condenses the light from the lower prism sheet in a second direction to irradiate the condensed light to the upper diffusion sheet. In this case, the second direction may be orthogonal to the first direction. The upper diffusion sheet is arranged on the upper prism sheet and diffuses the incident light from the upper prism sheet to irradiate the diffused light to the display panel 110.

As a variation, at least one of the lower diffusion sheet, the lower prism sheet, the upper prism sheet, and the upper diffusion sheet may be omitted depending on the structure of the back light unit 130.

Further, the aforementioned display unit 100 may be comprised of a light emitting display unit that includes a light emitting display panel having an organic light emitting element and a panel driver, instead of a liquid crystal display unit that includes the display panel 110, the panel driver 120 and the back light unit 130.

In FIGS. 1 and 2, the guide frame 200 supports the display panel 110. For this, the guide frame 200 includes a guide sidewall 210 and a panel supporter 220. The guide sidewall 210 is vertically or substantially vertically formed to surround the side of the display panel 110. The panel supporter 220 is horizontally protruded from the inner wall of the guide sidewall 210 to support rear edge(s) of the display panel 110. At this time, the panel supporter 220 may be formed to apply pressure on the optical member 138 of the back light unit 130, thereby preventing the optical member 138 from moving within the enclosed structure.

The rear set cover 300 receives the back light unit 130 therein and supports the guide frame 200 to surround the side(s) of the guide frame 200. For this, the rear set cover 300 includes a stair type step portion 310 at one or more inner sides of the rear set cover 300. For instance, the stair type step portion 310 may be formed at the inner sidewalls of the rear set cover 300 to form a frame mounting portion 312 where the guide frame 200 is securely mounted, and a receiving portion 314 where the back light unit 130 is securely positioned.

The front set cover 400 is coupled to the rear set cover 300 to surround the sides of the rear set cover 300, thereby surrounding the front corners of the display panel 110, whereby the front edges of the display device are formed. At this time, the front set cover 400 and the rear set cover 300 may be further secured to each other by a hook or other fasteners. In this case, the front set cover 400 may be formed of a plastic material to have a square frame shape. However, other shapes are possible.

The display device according to the first embodiment of the present invention allows the back light unit 130 and the guide frame 200 where the display panel 110 is mounted, to be received securely within the rear set cover 300, and at the same time, the display device surrounds the side(s) and the front corner(s) of the rear set cover 300 by using the front set cover 400, whereby the entire thickness of the display device is reduced effectively reduced while securing the elements within the display device. As a result, according to the first embodiment of the present invention, the lower and upper cases of the display device, which were always used and required in the conventional display devices, have been eliminated. Instead, a more effective and compact structure is provided in the invention, which reduces the thickness of the display device further while allowing the elements within the display device to be securely positioned.

Also, in the display device according to the first embodiment of the present invention, as the ground line 114 is formed at the non-display area of the lower substrate 112 to surround the display area AA, except for the part above the non-display area where the plurality of data pad portions DPP1, DPP2 and DPP3 are formed. Due to this configuration, tolerance against the static electricity can be improved through the ground line 114, whereby an electrostatic defect, which can be caused by an omission of the upper case in the present display device, is prevented from occurring.

Figure 4:
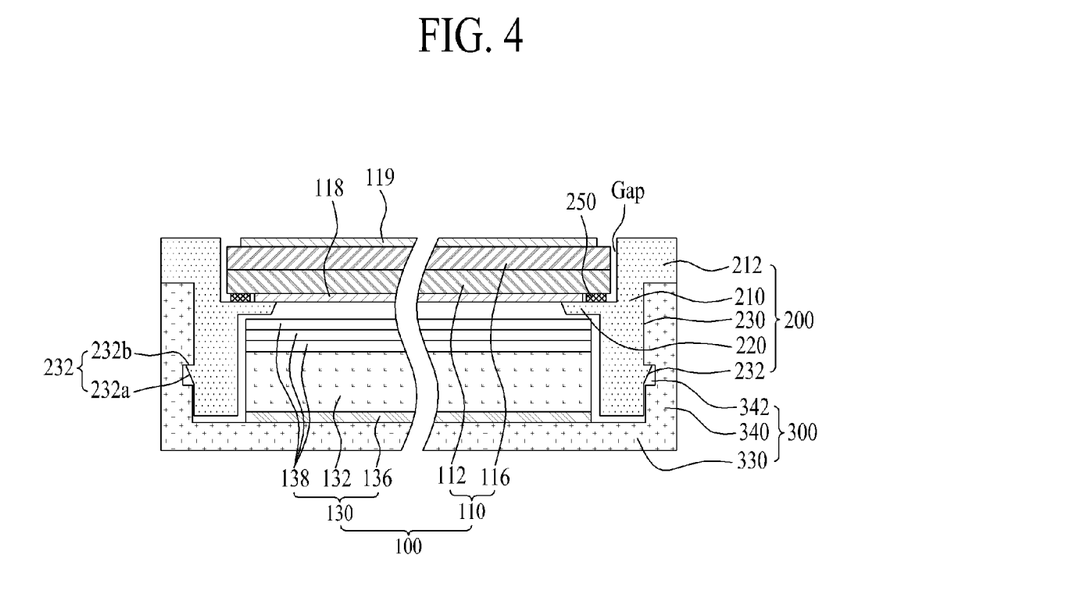
FIG. 4 is a sectional view illustrating a display device according to a second embodiment of the present invention.

FIG. 4 is a sectional view illustrating a display device according to a second embodiment of the present invention.

Referring to FIG. 4, the display device according to the second embodiment of the present invention includes a display unit 100, a guide frame 200, and a rear set cover 300. All components of the display device of FIG. 4 are operatively coupled and configured. The display device according to the second embodiment of the present invention is the same as the display device of the first embodiment of the present invention, except that the front set cover 400 is omitted and the guide frame 200 and the rear set cover 300 in FIG. 4 are partially different from those of the first embodiment in their structures. Accordingly, a part of the description of the configuration of the second embodiment, which is the same as that of the first embodiment, is omitted or briefly discussed.

Referring to FIG. 4, the guide frame 200 is externally exposed to surround the sides of the display panel 110, whereby the front edges of the display device are formed. For this, the guide frame 200 includes a guide sidewall 210, a panel supporter 220, a set cover insertion groove 230, and a first coupling member 232. As mentioned above, the display unit 100 in FIG. 4 has the same configuration/structure as the display unit 100 of FIG. 1.

The guide sidewall 210 is vertically or substantially vertically formed to surround the sides of the display panel 110 and the sides of the back light unit 130. At this time, a front surface and a side area of the guide sidewall 210 are externally exposed to form the front edge of the display panel 110.

The panel supporter 220 is horizontally or substantially horizontally protruded from the inner wall of the guide sidewall 210 to support rear edge/side portions of the display panel 110. At this time, an adhesive member 250 (or other fastener or fastening configuration) may be additionally attached or provided to the panel supporter 220 so that the display panel 110 is more securely fixed within the guide frame. The display panel 110 is attached to or securely positioned by the adhesive member 250. In this case, the adhesive member 250 may be attached or fixed to the lower polarizer 118 attached to either the rear surface of the display panel 110 and/or to the edge portion of the lower substrate 112. In this case, the display panel 110 is securely mounted on the panel supporter 220 by the adhesive member 250 or other fasteners.

The set cover insertion groove 230 is recessed to have a predetermined depth from the outer wall of the other guide sidewall 210, except for the front surface and the side 212 on the guide sidewall 210. The sidewall of the rear set cover 300 is inserted into the set cover insertion groove 230 so that the rear set cover 300 and the guide frame 200 are securely coupled with each other to function as a casing for the display panel 110 as shown in FIG. 4.

The first coupling member 232 is formed at a surface of the set cover insertion groove 230 to have a tilt surface 232a and an end portion 232b, and allows the guide frame 200 to be coupled to the rear set cover 300 more effectively. At this time, the first coupling member 232 may be formed to have a protrusion shape.

The rear set cover 300 receives the back light unit 130 and at the same time supports the guide frame 200 to surround the sides of the guide frame 200. For this, the rear set cover 300 includes a set plate 330, a set sidewall 340, and a second coupling member 342.

The set plate 330 is formed in a flat type to support and receive the back light unit 130 therein. The set sidewall 340 is vertically or substantially vertically formed by being bent from an edge portion of the set plate 330, thereby forming a receiving portion in which the back light unit 130 is positioned, and supporting the guide frame 200. The set sidewall 340 is inserted into the set cover insertion groove 230.

The second coupling member 342 is formed at the inner wall of the set sidewall 340 in a groove shape, and is coupled with the first coupling member 232 formed in the guide frame 200. Alternatively, the second coupling member 342 may be formed in a protrusion shape, while the first coupling member 232 is formed in a grooves shape so that they are coupled with each other. Other configurations may be used to couple the first and second coupling members 232 and 342 with each other, thereby providing a securing mechanism for the display device.

In the display device according to the second embodiment of the present invention, the upper case (that was present in the conventional display devices) and the front set cover (that was present in FIG. 1) are all omitted. As such, foreign substances such as dust may penetrate into the display unit 100 through a gap existing between the side of the display panel 110 and the guide frame 200. That is, in manufacturing each of the display panel 110 and the guide frame 200, a gap may exist between the side of the display panel 110 and the guide sidewall 210 of the guide frame 200 due to the process error. Accordingly, the display device in the second embodiment of the present invention can further include a sealing member for sealing such gaps. In that case, the sealing member may have a ring shape and may be inserted into the gap(s), a pin shape having a head portion, or a film shape attached between the display panel 110 and the guide frame 200 to cover the gap(s). The sealing member may have the same color as that of the guide frame 200, so that aesthetic effect may not be compromised due to the difference in color from the guide frame 200.

In the aforementioned display device according to the second embodiment of the present invention, the display panel 110 is mounted on the guide frame 200 through the adhesive member 250, and the guide frame 200 is coupled to the rear set cover 300, whereby the front set cover can be omitted compared to the first embodiment. In this way, according to the second embodiment of the present invention, as the front set cover 400 of the first embodiment is omitted, the thickness of the display device can be further reduced. Also, as the tolerance against the static electricity can be improved through the ground line formed in the display panel 110, an electrostatic defect which can be caused by the omission of the upper case and the front set cover, can be prevented from occurring.

Moreover, according to the second embodiment of the present invention, as the front edge portions of the display device are formed by the guide frame 200 in part, the upper surface 212 of the guide frame 200 and the display panel 110 are only exposed to users, whereby the edge portions of the display panel 110 can be minimized to improve aesthetic effects.

In the display device according to the second embodiment of the present invention, although it has been described that the front set cover (400) is omitted, and the front edge portions of the display panel 110 are formed by the guide frame 200 to improve the aesthetic effect of the edge portions of the display panel 110, deterioration of the aesthetic effect due to the omission of the front set cover can be prevented from occurring through a structural modification of the guide frame 200 and/or the rear set cover 300 only. In this case, the other configuration of the display device, except for the structural modification of the guide frame 200 and/or the rear set cover 300 only, is the same as that of the second embodiment or FIG. 4.

Figure 5:
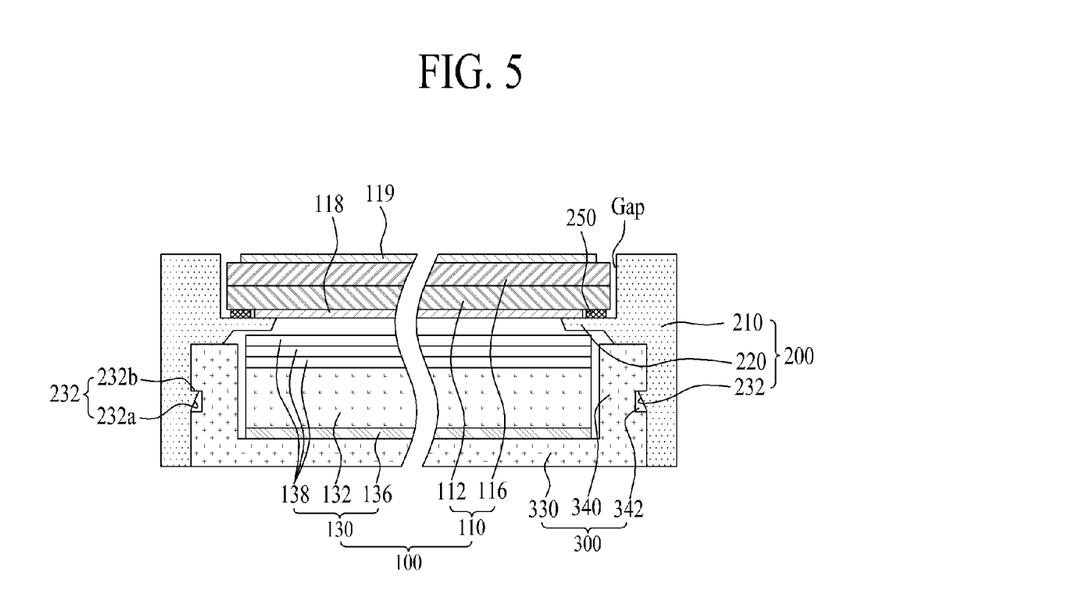
FIG. 5 is a sectional view illustrating a display device according to a third embodiment of the present invention.

For example, as shown in FIG. 5 according to a third embodiment of the present invention, the guide frame 200 of the display device surrounds the outer wall of the set sidewall 340 and at the same time surrounds the side of the display panel 110 to form the front edges of the display panel 110, whereby the aesthetic effect of the edge portion of the display device can be improved. For instance, because the outer sides of the display device in FIG. 5 are established entirely by the walls of the guide frame 200, as compared to both the guide frame 200 and the rear set cover 300 as in FIG. 4 for example, the aesthetic aspects of the display device in FIG. 5 may be improved. The display unit 100 in FIG. 5 has the same configuration/structure as the display unit 100 of FIG. 1.

Figure 6:
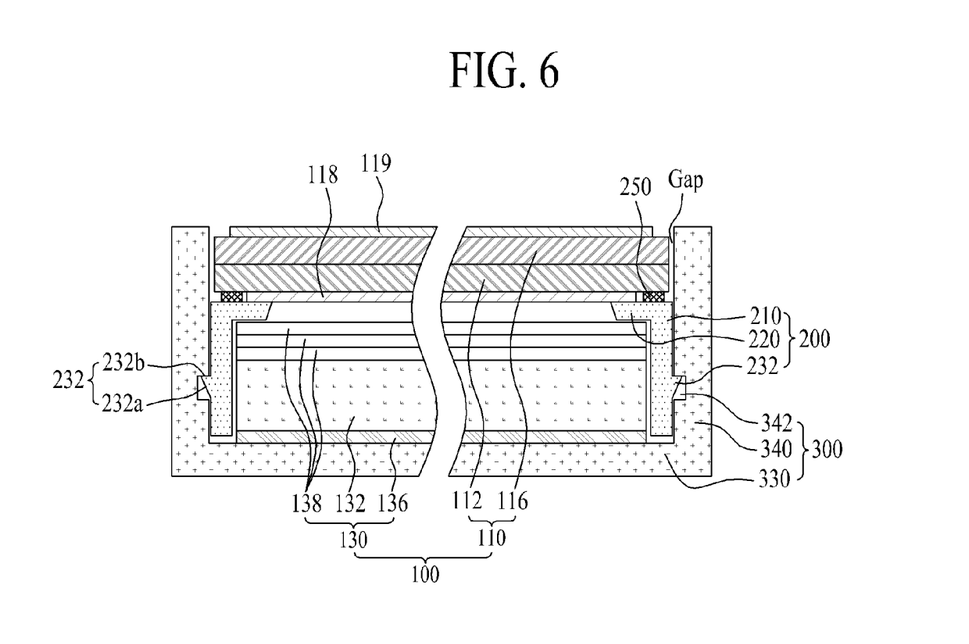
FIG. 6 is a sectional view illustrating a display device according to a fourth embodiment of the present invention.

For another example, as shown in FIG. 6 according to a fourth embodiment of the present invention, the rear set cover 300 of the display device surrounds the sides of the guide frame 200 and at the same time surrounds the sides of the display panel 110 to form the front edges of the display panel 110, whereby the aesthetic effect of the edge portions of the display device can be improved. For instance, because the outer sides of the display device in FIG. 6 are established entirely by the walls of the rear set cover 300, as compared to both the guide frame 200 and the rear set cover 300 as in FIG. 4 for example, the aesthetic aspects of the display device in FIG. 6 may be improved. The display unit 100 in FIG. 6 has the same configuration/structure as the display unit 100 of FIG. 1. Further, the fastener such as 250 of FIG. 4 can be provided in the display device of FIGS. 5 and 6.

According to the embodiments of the present invention, one or more features discussed in one of the embodiments/examples can be applied to any of the other embodiments/examples. Features discussed in two or more embodiments/examples may be combined into a single display device. The display devices of the present invention can be various display types such as liquid crystal display devices, OLED display devices, etc.

As described above, the display panel and the display device comprising the same according to the embodiments of the present invention have the following advantages.

First of all, as the lower and upper cases which were regarded as the necessities of the conventional display device are omitted, the thickness of the display device in the invention can be minimized.

Second, as the ground line is formed in the non-display area of the lower substrate except for a part of the non-display area to surround the display area in the invention, tolerance against static electricity can be improved through the ground line, whereby an electrostatic defect caused by omission of the upper case can be prevented from occurring.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display panel comprising:
    a lower substrate provided with a display area and a non-display area;
    a plurality of data pad portions formed at the non-display area adjacent to a first side region of the display area;
    an upper substrate bonded to the lower substrate, except for the non-display area adjacent to the first side region of the display area; and
    at least one ground line supplied with ground power, and formed on the lower substrate of the non-display area to surround in part an outline portion of the display area, the at least one ground line including a first ground line connected between a first data pad portion and a last data pad portion of the plurality of data pad portions,
    wherein the first ground line, without separation by any pad portions, extends along all of the side regions of the display area except for the first side region.

2. The display panel of claim 1, wherein the at least one ground line includes a plurality of ground lines partially formed on the non-display area adjacent to the first side region of the display area, and respectively provided between the data pad portions.

3. The display panel of claim 2, wherein each of the first data pad portion and the last data pad portion further comprises a first ground pad and a last ground pad respectively connected to the plurality of ground lines.

4. The display panel of claim 1, further comprising:
    at least one gate driving circuit formed in the lower substrate on the non-display area adjacent to the display area, and configured to drive a plurality of gate lines.

5. A display device comprising:
    a display unit including a display panel;
    a guide frame for supporting the display unit; and
    a rear set cover for supporting the guide frame,
    wherein the display panel comprises:
    a lower substrate provided with a display area and a non-display area;
    a plurality of data pad portions formed at the non-display area adjacent to a first side region of the display area;
    an upper substrate bonded to the lower substrate, except for the non-display area adjacent to the first side region of the display area; and
    at least one ground line supplied with a ground power, and formed on the lower substrate of the non-display area to surround in part an outline portion of the display area, the at least one ground line including a first ground line connected between a first data pad portion and a last data pad portion of the plurality of data pad portions,
    wherein the first ground line, without separation by any pad portions, extends along all of the side regions of the display area except for the first side region.

6. The display device of claim 4, wherein the at least one ground line includes a plurality of ground lines partially formed on the non-display area adjacent to the first side region of the display area, and respectively provided between each of the data pad portions.

7. The display panel of claim 5, wherein each of the first data pad portion and the last data pad portion further comprises a first ground pad, and a last ground pad respectively connected to the plurality of ground lines.

8. The display device of claim 4, further comprising: at least one gate driving circuit formed in the lower substrate on the non-display area adjacent to the display area, and configured to drive a plurality of gate lines.

9. The display device of claim 4, wherein the display unit further includes a panel driver connected to the display panel to drive pixels and supply the ground power to the at least one ground line.

10. The display device of claim 7, wherein the panel driver includes:
    a plurality of circuit films connected to each of the plurality of data pad portions;
    a plurality of data driving chips packaged in each of the plurality of circuit films to supply data signals to the data lines; and
    a printed circuit board connected to the plurality of circuit films to supply the ground power to the at least one ground line.

11. The display device of claim 10, wherein the at least one ground line is connected to the printed circuit board to form a closed loop.

12. The display device of claim 5, wherein the display device is without a front set cover or an upper case.

13. The display device of claim 5, further comprising: a front set cover coupled to the rear set cover to surround at least one side of the rear set cover, the front set cover surrounding at least one front edge of the display panel.

14. The display device of claim 5, further comprising: a fastener configured to couple the display panel and the guide frame, wherein the guide frame is coupled to the rear set cover and externally exposed to surround a side of the display panel and forms a front edge of the display device.

15. A display device comprising:
    a display unit including a display panel and a backlight unit;
    a guide frame disposed in part between the display panel and the backlight unit and including a panel supporter for supporting the display panel thereon; and
    a rear set cover including an area for receiving the backlight unit therein,
    wherein either a portion of the guide frame or a portion of the rear set cover extends forwardly so as to form a front face of the display device along with the display panel, and
    wherein the display panel comprises:
    a lower substrate provided with a display area and a non-display area;
    a plurality of data pad portions formed at the non-display area adjacent to a first side region of the display area;
    an upper substrate bonded to the lower substrate, except for the non-display area adjacent to the first side region of the display area; and at least one ground line supplied with ground power, and formed on the lower substrate of the non-display area to surround in part an outline portion of the display area, the at least one ground line including a first ground line connected between a first data pad portion and a last data pad portion of the plurality of data pad portions, wherein the first ground line, without separation by any pad portions, extends along all of the side regions of the display area except for the first side region.

* * * * *